United States Patent [19]

Byram

[11] Patent Number: 4,643,038
[45] Date of Patent: Feb. 17, 1987

[54] ELECTRIC MOTOR SERVO FOR CRUISE CONTROL

[75] Inventor: Robert J. Byram, Grand Blanc, Mich.

[73] Assignee: General Motors Corporation, Detroit, Mich.

[21] Appl. No.: 737,241

[22] Filed: May 23, 1985

[51] Int. Cl.[4] .................... F16H 35/06; F16H 3/34; B60K 31/02

[52] U.S. Cl. ........................ 74/397; 74/354; 74/384; 74/425; 180/178

[58] Field of Search ............. 74/405, 406, 354, 384, 74/397, 425; 180/179, 178, 315

[56] References Cited

U.S. PATENT DOCUMENTS

| | | | |
|---|---|---|---|
| 2,348,808 | 5/1944 | Guilar | 74/405 |
| 2,747,423 | 5/1956 | Sanders | 74/405 |
| 2,748,617 | 6/1956 | Deibel | 74/405 |
| 4,132,284 | 1/1979 | Tomecek | 180/179 |
| 4,161,994 | 7/1979 | Collonia | 180/179 |
| 4,187,734 | 2/1980 | Mann | 74/405 |
| 4,287,782 | 9/1981 | Ruschek | 74/405 |
| 4,533,114 | 8/1985 | Cory et al. | 74/406 |
| 4,569,239 | 2/1986 | Shirley et al. | 74/405 |

FOREIGN PATENT DOCUMENTS

2819070 10/1979 Fed. Rep. of Germany .

OTHER PUBLICATIONS

VDO Adolf Schindling AG Production drawing.

*Primary Examiner*—Allan D. Herrmann
*Attorney, Agent, or Firm*—Mark A. Navarre

[57] ABSTRACT

A pair of coupling elements connected between an electric stepper motor and an engine throttle are selectively engaged and disengaged by a lever mechanism which effects a relative movement between the coupling elements in response to a mechanical input from a solenoid actuator. The lever mechanism includes integral elements for calibrating the relative movement between the coupling elements for a given mechanical input from the solenoid actuator so as to compensate for manufacturing and assembly tolerances of the various components.

4 Claims, 7 Drawing Figures

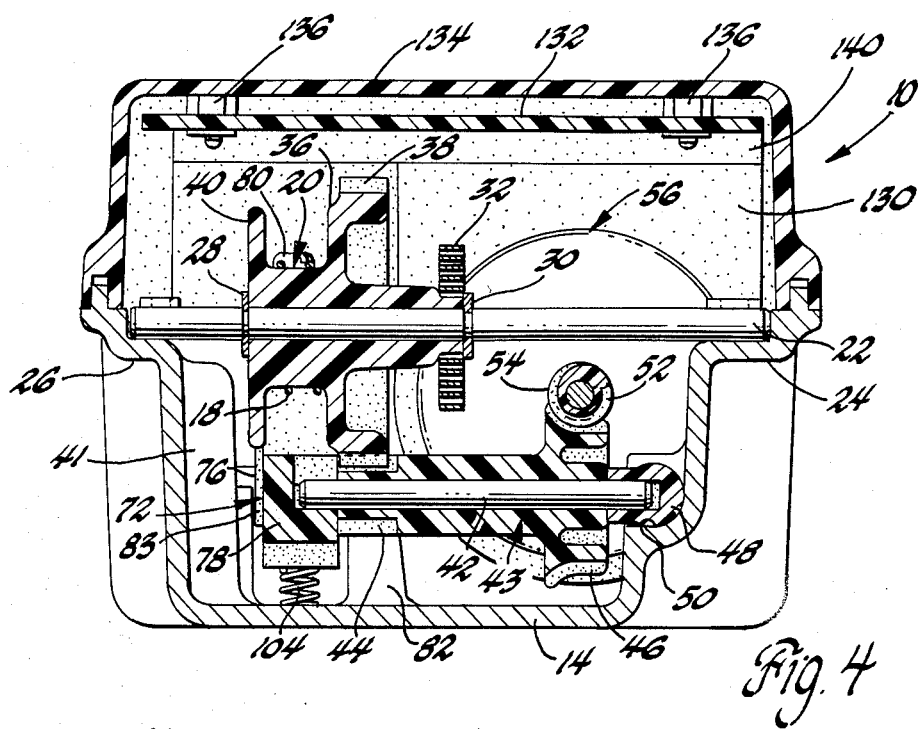

ELECTRIC MOTOR SERVO FOR CRUISE CONTROL

This invention relates to a selectively engageable engine throttle position controller and more particularly to a lever mechanism for effecting engagement and disengagement of the control.

BACKGROUND OF THE INVENTION

Engine and vehicle speed regulation systems typically include a servo mechanism for positioning the engine throttle in order to achieve a desired speed and a coupling mechanism connected between the servo mechanism and the throttle for selectively engaging and disengaging the control. When speed regulation is desired, the coupling mechanism is actuated to engage the control; when speed regulation is not desired or when a malfunction is detected, the coupling mechanism is actuated to disengage the control.

In one type of speed regulation system, a Bowden cable or the like is attached to the engine throttle, and is positioned by the output shaft of a rotary electric motor through two or more gear elements. When the gear elements are in meshing engagement, the motor is connected to position the throttle; when the gear elements are moved out of meshing engagement, the motor is disconnected from the throttle. An example of a speed regulation system of this type is shown in the U.S. Pat. No. 4,187,734 to Mann issued Feb. 12, 1980.

A manufacturing and assembly problem with regulating systems of the type described above, is that unless the various system components are precision formed, their cumulative tolerance variations result in some system-to-system differences of operation. Respecting the coupling mechanism, it is important to ensure that the gear elements properly mesh or unmesh when it is desired to engage or disengage the control. As a result, some calibration of the coupling mechanism is needed if it is decided to forgo the expense of precision formed components.

SUMMARY OF THE INVENTION

This invention is directed to a mechanism for selectively engaging and disengaging a pair of coupling elements in a throttle position controller including integral means for calibrating the mechanism so as to compensate for manufacturing and assembly tolerances. Essentially, the mechanism is in the form of a lever and comprises first and second members angularly displaceable about the axis of a fixed pin. The first member is mounted so as to pivot about the pin and the second member is mounted to the first member for angular displacement therewith. The second member has a pair of arms extending transverse the axis. One of such arms has an input location formed thereon which is adapted to be displaced by a solenoid actuator to a first angular position with respect to the axis. The other arm has an output location formed thereon adapted to move the coupling elements into and out of meshing engagement, the coupling elements being in proper meshing engagement when the output location has been displaced to a second angular position in respect to the axis.

Integral means are provided for adjusting the mounting of the second member in relation to the first member so as to shift the position of the second member at least radially in respect to the axis such that the output location on the second arm is displaced to the second angular position with respect to the axis when the first arm is displaced by the solenoid actuator to the first angular position. In this way, the lever mechanism is calibrated so that a proper meshing engagement of the coupling elements is achieved when the solenoid actuator displaces the input location of the second member to the first predetermined angular position despite the manufacturing and assembly tolerance variations. The calibration may be performed manually or automatically using a gauge or other position measuring instrument for indicating when the proper calibration has been achieved.

In the illustrated embodiment, the second member includes a stem extending radially with respect to the axis and the first member takes the form of a bifurcated sleeve pivotably mounted on the pin. The first and second members are mounted together by a screw or like fastener threaded into one of the members, and the calibration is effected by turning the screw to adjust the mounting of the second member in relation to the first member along a line substantially radial to the axis.

IN THE DRAWINGS

FIG. 2 depicts the lever mechanism of this invention in a position for engaging the throttle position control, and FIG. 3 depicts the lever mechanism in a position for disengaging the throttle position control.

Figure 2:
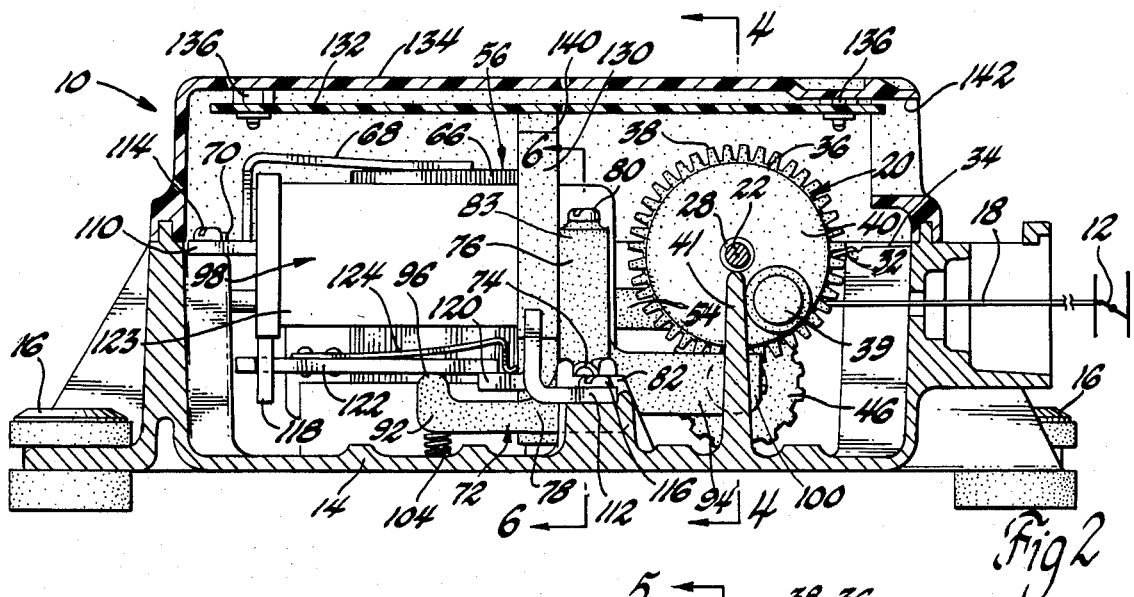
FIGS. 2 and 3 are cross-sectional views of the controller depicted in FIG. 1 along the lines 2—2.
Figure 3:
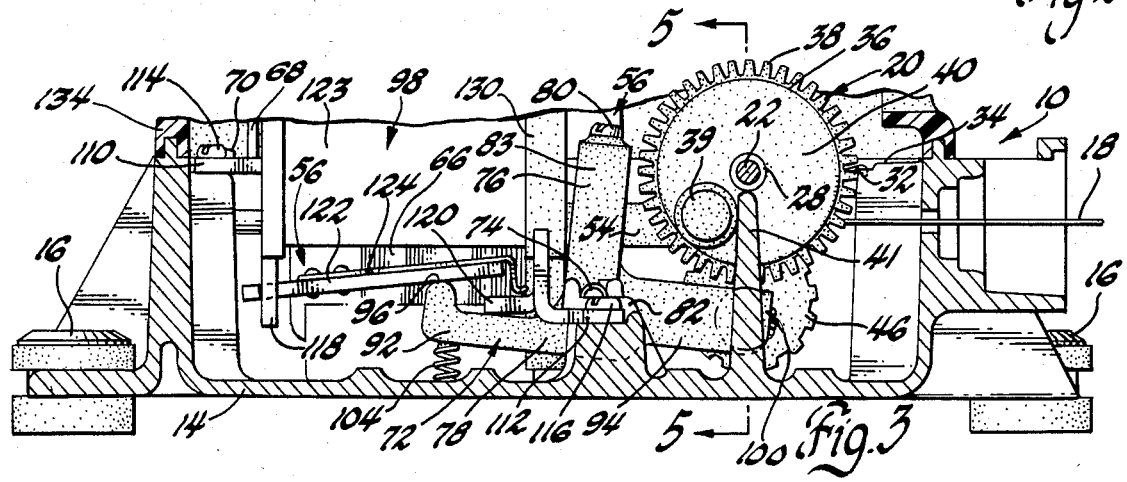

FIGS. 4 and 5 are cross-sectional views of the controller taken along lines 4—4 and 5—5 as seen in FIGS. 2 and 3, respectively. FIG. 4 depicts the coupling elements when meshingly engaged by the lever mechanism, and FIG. 5 depicts the coupling elements when disengaged by the lever mechanism.

FIG. 6 is a cross-sectional view of the lever mechanism taken along lines 6—6 of FIG. 2.

FIG. 7 is a cross-sectional view of the lever mechanism taken along lines 7—7 of FIG. 6.

Figure 1:
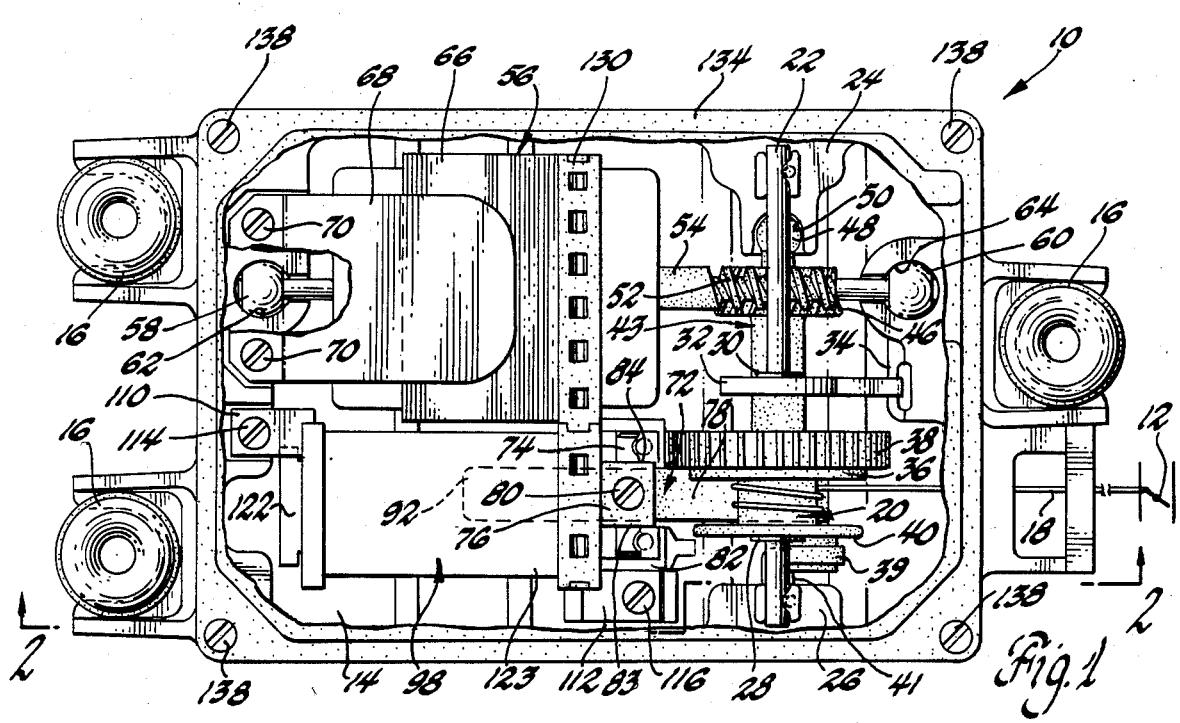
FIG. 1 is a top view of an electric motor driven engine throttle position controller according to this invention with the cover plate and control circuitry broken away.

Referring now more particularly to FIGS. 1 and 2, the reference numeral 10 generally designates a control mechanism for adjusting the position of an engine throttle as schematically represented in the Figures and designated by the reference numeral 12. The various controller components are supported within a die cast housing 14 which is mounted to a fixed vehicle support member by suitable attachment means at the grommet/flange locations 16. The mechanical connection between the throttle 12 and the controller 10 is by way of a Bowden cable 18 or the like, which cable is supported and retained within the controller 10 by the pulley 20. The pulley 20, in turn, is rotatably supported on an upper shaft 22 which is staked onto a pair of housing supports 24 and 26. As may be best seen in FIGS. 4 and 5, the pulley 20 is axially retained on the upper shaft 22 by the snap rings 28 and 30. A spiral band spring 32 supported on the inboard end of the pulley 20 is also axially retained by the snap ring 30, the free end of the spring 32 being retained by the housing lip 34. Spring 32 is wound so as to exert a releasing force on the pulley 20, which force must be overcome to effect a movement of the throttle 12. The face 36 of the pulley 20 has gear teeth 38 formed on its periphery, which teeth are engageable with the teeth of a further gear element, as will later be described. A knob 39 integral with the outboard pulley face 40 contacts the opposing sides of housing flange 41 as shown in FIGS. 2 and 3 to limit the rotation of pulley 20.

A lower shaft 42 is supported within the housing member 14 beneath the upper shaft 22, and rotatably supports a sleeve member 43 having geared surfaces 44 and 46 at opposite ends thereof. The lower shaft 42 is supported in the housing 14 at one end thereof by a ball sleeve 48 which rests in a housing pocket 50. The other end of the lower shaft 42 is supported by the lever mechanism of this invention which operates, as will later be described, to selectively raise and lower such end of the lower shaft 42 to selectively engage and disengage the gear teeth 38 and 44. FIGS. 2 and 4 depict the lower shaft 42 in the raised position engaging the gear elements 38 and 44 while FIGS. 3 and 5 depict the lower shaft 42 in the lowered position disengaging the gear elements 38 and 44.

The gear teeth 46 of the sleeve member 43 are of the worm gear variety and continuously mesh with a complementary worm gear 52 formed on the rotor shaft 54 of an electric stepper motor designated generally by the reference numeral 56. The rotor shaft 54 is supported at each end thereof in the housing member 14 by the bearings 58 and 60 which seat in the housing pockets 62 and 64. The motor stator 66 rests within the housing 14 and is retained by the plate 68, which in turn, is secured to the housing 14 by the fasteners 70.

The lever mechanism of this invention, which operates as indicated above to raise and lower the lower shaft 42 to engage and disengage the gear elements 38 and 44, is generally designated by the reference numeral 72 and is best seen in the FIGS. 6 and 7. Essentially, the lever mechanism comprises a pin 74, a first member 76 pivotably supported on pin 74, and a second member 78 mounted to the first member 76 by the screw fastener 80. The pin 74 is staked onto the housing support 82, and passes through similar diameter openings in the bifurcated arms 83 and 84 of the first member 76 so that the first member 76 is angularly displaceable about the axis 86 of the pin 74. The second member 78 of the lever mechanism 72 is best seen in the section of FIG. 7 and includes a tapped stem 90 for receiving the threads of the screw 80, and a pair of arms 92 and 94 extending transverse to the axis 86 of the pin 74. The arm 92 has formed thereon an input location 96 for receiving a mechanical input from a solenoid actuator 98, as will later be described, and the arm 94 has an output location 100 formed thereon for receiving and supporting the lower shaft 42, as indicated above. The head of screw fastener 80 is seated on the upper surface of the first member 76 and a spring 102 separates the first and second members 76 and 78 to tension the parts as an aid in their assembly. The spring 104 operates on the arm 92 of second member 78 and biases the second member 78 toward the position depicted in FIGS. 3 and 5, disengaging the gear elements 38 and 44.

The solenoid actuator 98 is supported within the housing 14 by the straps 110 and 112 and the fasteners 114 and 116, as best seen in FIGS. 1-3. The magnetic circuit of the solenoid actuator 98 includes the stationary arms 118 and 120 and the movable arm 122. The movable arm 122 hinges in the stationary arm 118 and is movable between its normally open position as depicted in FIG. 3 and its closed position as depicted in FIG. 2. The movable arm 122 is in constant contact with the input location 96 of the lever mechanism 72 and serves to angularly displace the second member 78 about the axis 86 of pin 74 to selectively engage and disengage the gears 38 and 44. When the movable arm 122 is in the normally open position, as shown in FIG. 3 and as urged by the spring 104, the output location 100 of the second member arm 94 is displaced to an angular position in respect to the axis 86 of the pin 74 for which the gears 38 and 44 are disengaged. When the movable arm 122 is in its closed position, as depicted in FIG. 2 by the operation of the solenoid actuator 98, the output location 100 of the second member arm 94 is displaced to an angular position in respect to the axis 86 of pin 74 for which the gear elements 38 and 44 are meshingly engaged. The movable arm 122 is moved from its normally open position to its closed position through energization of the solenoid actuator coil 123 with electrical current. Such energization produces an attractive force between the movable arm 122 and the stationary arm 120, such force increasing in magnitude as the arms 120 and 122 near. The leaf spring 124 mounted on the movable arm 122 contacts the stationary arm 120 as the arms 120 and 122 approach contact and serves to lessen the net attractive force between the arms so that upon deenergization of the coil, the movable arm 122 will be urged toward its normally open position.

The electrical leads for energizing the windings of the stepper motor 56 and the solenoid actuator coil 123 are attached to the female connector block 130. A printed circuit board 132 supports the circuitry for energizing the stepper motor 56 and solenoid actuator coil 123 and is supported on the housing cover 134 via the connectors 136. The housing cover 134 in turn is secured to the housing 14 via the fasteners 138. The printed circuit board 132 has mounted thereon a male connector strip 140 which mates with the female connector strip 130 for providing electrical connections between the control circuitry mounted on the circuit board 132 and the motor 56 and solenoid actuator 98 mounted in the housing 14. Electrical power and control signals for the circuitry on circuit board 132 are fed through the housing cover 134 through the opening 142.

When regulation of the engine throttle 12 is desired, the solenoid coil 123 is energized to displace the input location 96 of lever mechanism 72 as shown in FIGS. 2, 4 and 7 for engaging the teeth of gears 38 and 44. Thereafter, the windings of stepper motor 56 are suitably energized with electric current through the circuit board components and the connectors 130 and 140, and the rotation of the motor rotor shaft 54 operates to move the throttle 12 through the gear elements 46, 52 and 38, 44. When regulation of the throttle 12 is no longer desired or when a system malfunction is sensed, the solenoid coil 123 is deenergized, and the springs 124 and 104 displace the input location 96 of lever mechanism 72 as shown in FIGS. 3 and 5 for disengaging the teeth of gears 38 and 44. At such point, the rotor shaft 54 of stepper motor 56 is decoupled from the pulley 20, and the spring 32 rotates the pulley 20 to the released position as seen in FIG. 3 to release the tension on cable 18.

At a predefined point in the assembly of the controller 10, the operation of the lever mechanism is calibrated for manufacturing and assembly tolerances through an adjustment of the screw 80. As indicated above, adjustment of the screw 80 results in an adjustment of the mounting of the second member 78 in relation to the first member 76 so as to shift the position of the second member 78 at least radially in respect to the axis 86 of pin 74. This operation serves to alter the relative displacement angle of the arms 92 and 94 in respect to the axis 86 so as to adjust the angular position of the output location 100 for a given angular location of the input location 96. The object is to ensure that when the movable arm 122 of solenoid actuator 98 is in its normally open position, the gear teeth 38 and 44 are disengaged, and also to ensure that when the movable arm 122 is in its normally closed position, the gear teeth 38 and 44 are properly meshed, it being understood that normal manufacturing and assembly tolerances produces some variation in operation from controller to controller. Although the calibration process may be performed manually or automatically in a number of ways, it is preferably performed in an automatic fashion by energizing the solenoid coil 123 and effecting an adjustment of the screw 80 until a gauge or like instrument detects that the output location 100 of arm 94 is positioned so as to effect proper meshing engagement of the gears 38 and 44. In this regard, it will be understood that the calibration procedure may be performed when the controller 10 is only partially assembled—that is, prior to the mounting of upper shaft 22 and pulley 20 in the housing 14. When the lever mechanism 72 is properly calibrated in this manner, the travel afforded by the movement of the arm 122 of solenoid actuator 98 is sufficient to ensure that the gear teeth 38 and 44 are completely disengaged upon deenergization of the solenoid coil.

The layout of the various controller components within the housing 14 permits ease of assembly in that each of the components may be inserted and secured from the top side of the housing 14 as seen in FIG. 1. Moreover, the calibration of lever mechanism 72 is also performed from the top side of housing 14. Following assembly and calibration of the various controller components, the housing cover 134 and circuit board 132 are mounted on the housing 14, thereby mating the strip connectors 130 and 140 to electrically connect the control circuitry to the motor 56 and solenoid coil 123, and completing the controller assembly.

While this invention has been described in respect to the illustrated embodiment, it will be understood that various modifications thereto will occur to those skilled in the art and that systems and mechanisms incorporating such modifications may fall within the scope of this invention which is defined by the appended claims.

The embodiments of the invention in which an exclusive property or privilege is claimed are defined as follows:

1. A lever mechanism for engaging a pair of coupling elements through which motion is transmitted to operate the throttle of an engine, the mechanism comprising:
   a first member mounted for angular displacement about an axis;
   a second member mounted to the first member for angular displacement therewith, the second member having first and second arms extending transverse of the axis to define a relative displacement angle with respect to the axis as measured between an input location on the first arm and an output location on the second arm;
   input means coacting at the input location on the first arm for displacing the first arm to a first angular position with respect to the axis as measured from the input location when it is desired to engage the coupling elements;
   output means coacting at the output location on the second arm for engaging the coupling elements when the second arm is displaced to a second angular position with respect to the axis as measured from the output location; and
   means for adjusting the mounting of the second member in relation to the first member so as to shift the position of the second member at least radially with respect to the axis thereby altering said relative displacement angle of the first and second arms in relation to the axis such that the second arm attains the second angular position when the first arm attains the first angular position whereby the lever mechanism is calibrated to compensate for manufacturing and assembly tolerances.

2. An engine throttle actuator including a pair of coupling elements supported in an actuator housing for transmitting the rotary output of an electric motor to an engine throttle and a lever mechanism for selectively engaging the coupling elements to enable throttle actuation, such lever mechanism comprising:
   pin means supported in said housing;
   a first member mounted for angular displacement about the axis of said pin means;
   a second member mounted to the first member for angular displacement therewith, the second member having first and second arms extending transverse of the axis to define a relative displacement angle with respect to said axis as measured between an input location on the first arm and an output location on the second arm;
   input means including an electrically actuated solenoid acting at the input location on the first arm for displacing the first arm to a first position with respect to said housing when it is desired to engage the coupling elements;
   output means coacting at the output location on the second arm for engaging the coupling elements when the second arm is displaced to a second position with respect to said housing as measured from the output location; and
   means for adjusting the mounting of the second member in relation to the first member so as to shift the position of the second member at least radially with respect to said axis thereby altering said relative displacement angle of the first and second arms in relation to said axis such that the second arm attains the second position when the first arm attains the first position whereby the lever mechanism is calibrated to compensate for manufacturing and assembly tolerances.

3. An engine throttle actuator as set forth in claim 2, wherein:
   the first member of said lever mechanism includes a pair of laterally spaced extensions joined at one end thereof and rotatably mounted on said pin means at the other end thereof, the second member of said lever mechanism includes a stem portion extending radially with respect to the axis of said pin means at least partly into the space separating the extensions of said first member, and the second member is mounted to the first member with threaded fastener means seated in the one end of said first member and threaded radially with respect to said axis into the stem portion of the second member, whereby the mounting of the second member in relation to the first member is adjusted by affecting an adjustment of said threaded fastener means.

4. An engine throttle actuator as set forth in claim 3, including:
resilient means disposed about said threaded fastener means between the joined end of the first member extensions and the stem portion of said second member, thereby to maintain the relative mounting of the first and second members defined by the adjustment of said threaded fastener means.

* * * * *